United States Patent
Yi et al.

(10) Patent No.: US 10,419,315 B2
(45) Date of Patent: Sep. 17, 2019

(54) METHOD FOR PERFORMING A PACKET DELAY CALCULATION IN A PDCP ENTITY IN A WIRELESS COMMUNICATION SYSTEM AND A DEVICE THEREFOR

(71) Applicant: LG ELECTRONICS INC., Seoul (KR)

(72) Inventors: Seungjune Yi, Seoul (KR); Sunyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/554,618

(22) PCT Filed: Mar. 15, 2016

(86) PCT No.: PCT/KR2016/002595
§ 371 (c)(1),
(2) Date: Aug. 30, 2017

(87) PCT Pub. No.: WO2016/159541
PCT Pub. Date: Oct. 6, 2016

(65) Prior Publication Data
US 2018/0041413 A1    Feb. 8, 2018

Related U.S. Application Data

(60) Provisional application No. 62/142,492, filed on Apr. 3, 2015, provisional application No. 62/143,225, filed on Apr. 6, 2015.

(51) Int. Cl.
*H04L 12/26* (2006.01)
*H04W 80/02* (2009.01)
(Continued)

(52) U.S. Cl.
CPC ........ *H04L 43/0852* (2013.01); *H04L 43/106* (2013.01); *H04W 24/10* (2013.01);
(Continued)

(58) Field of Classification Search
CPC . H04L 1/1812; H04L 43/0852; H04L 43/106; H04W 12/02; H04W 24/10; H04W 80/02
See application file for complete search history.

(56) References Cited

U.S. PATENT DOCUMENTS 7,400,893 B2 *  7/2008  Yi ........................... H04L 69/04
                                                        455/464
8,000,256 B2 *  8/2011  Cha ....................... H04L 1/1685
                                                        370/252

(Continued)

FOREIGN PATENT DOCUMENTS

KR    10-2011-0089684 A    9/2011
WO       2014084499 A1    6/2014

*Primary Examiner* — Asad M Nawaz
*Assistant Examiner* — Thomas R Cairns
(74) *Attorney, Agent, or Firm* — Dentons US LLP

(57) ABSTRACT

A method and device for performing a packet delay calculation in a PDCP entity in a wireless communication system. The method including receiving, by a PDCP transmitter, a PDCP SDU from an upper layer; generating, by the PDCP transmitter, a PDCP data PDU including the PDCP SDU and a time field corresponding to the PDCP SDU, wherein a value of the time field is set to a time when the PDCP SDU received from the upper layer; and transmitting, by the PDCP transmitter, the generated PDCP data PDU to a PDCP receiver.

13 Claims, 16 Drawing Sheets

(51) Int. Cl.
*H04W 24/10* (2009.01)
*H04W 12/02* (2009.01)
*H04L 1/18* (2006.01)

(52) U.S. Cl.
CPC .......... *H04W 80/02* (2013.01); *H04L 1/1812* (2013.01); *H04W 12/02* (2013.01)

(56) References Cited

U.S. PATENT DOCUMENTS

| | | | |
|---|---|---|---|
| 8,671,276 B2 * | 3/2014 | Bhogal | H04L 9/00 380/28 |
| 8,848,661 B2 * | 9/2014 | Wang | H04L 1/1838 370/331 |
| 9,402,264 B2 * | 7/2016 | Zhu | H04W 52/04 |
| 9,942,213 B2 * | 4/2018 | de Andrade | H04L 63/08 |
| 9,998,434 B2 * | 6/2018 | Verzun | H04L 63/102 |
| 2011/0286416 A1 | 11/2011 | Wang et al. | |
| 2014/0160960 A1 | 6/2014 | Qi | |
| 2014/0254393 A1 | 9/2014 | Yi et al. | |

* cited by examiner

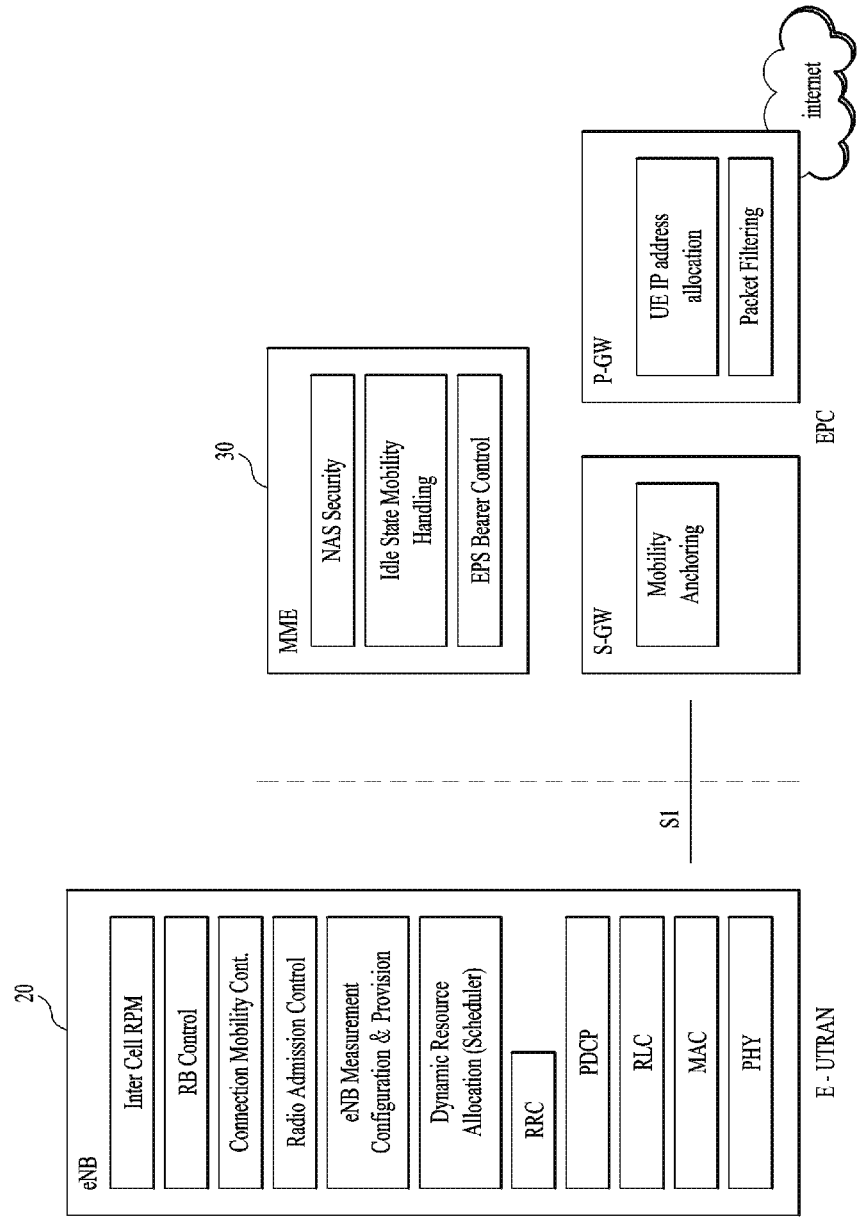

(a) Control-Plane Protocol Stack (b) User-Plane Protocol Stack

PDCP Data PDU format for SRBs

PDCP Data PDU format for DRBs using a 12 bit SN

PDCP Data PDU format for DRBs using 7 bit SN

PDCP Control PDU format for PDCP status report using a 12 bit SN

PDCP Control PDU format for PDCP status report using a 15 bit SN

PDCP Control PDU format for PDCP status report using an 18 bit SN

PDCP Control PDU format for interspersed ROHC feedback packet

Logged MDT : UE in IDLE mode

Immediate MDT : UE in RRC_Connected mode

METHOD FOR PERFORMING A PACKET DELAY CALCULATION IN A PDCP ENTITY IN A WIRELESS COMMUNICATION SYSTEM AND A DEVICE THEREFOR

This application is a 35 USC § 371 National Stage entry of International Application No. PCT/KR2016/002595, filed on Mar. 15, 2016, and claims priority to U.S. Provisional Application No. 62/142,492, filed on Apr. 3, 2015, and U.S. Provisional Application No. 62/143,225, filed on Apr. 6, 2015 all of which are incorporated by reference in their entirety herein.

TECHNICAL FIELD

The present invention relates to a wireless communication system and, more particularly, to a method for performing a packet delay calculation in a PDCP entity in a wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for performing a packet delay calculation in a PDCP entity in a wireless communication system. The technical problems solved by the present invention are not limited to the above technical problems and those skilled in the art may understand other technical problems from the following description.

Technical Solution

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects

According to the present invention, a delay measurement method in downlink can be used for uplink, because the eNB can know the time when PDCP entity of the UE receives a PDCP SDU from an upper layer It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 2B is a block diagram depicting architecture of a typical E-UTRAN and a typical EPC;

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
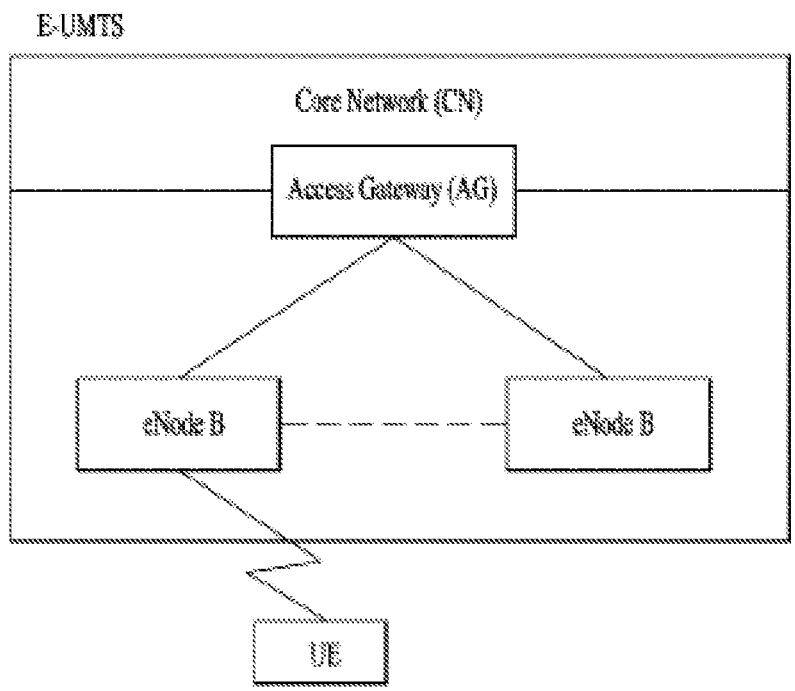
FIG. 1 is a diagram showing a network structure of an Evolved Universal Mobile Telecommunications System (E-UMTS) as an example of a wireless communication system.
Figure 2A:
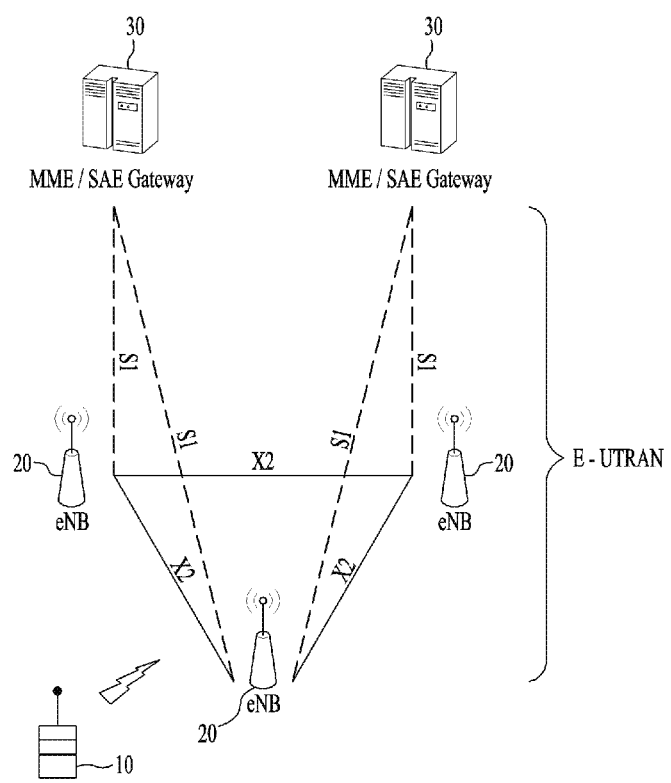
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
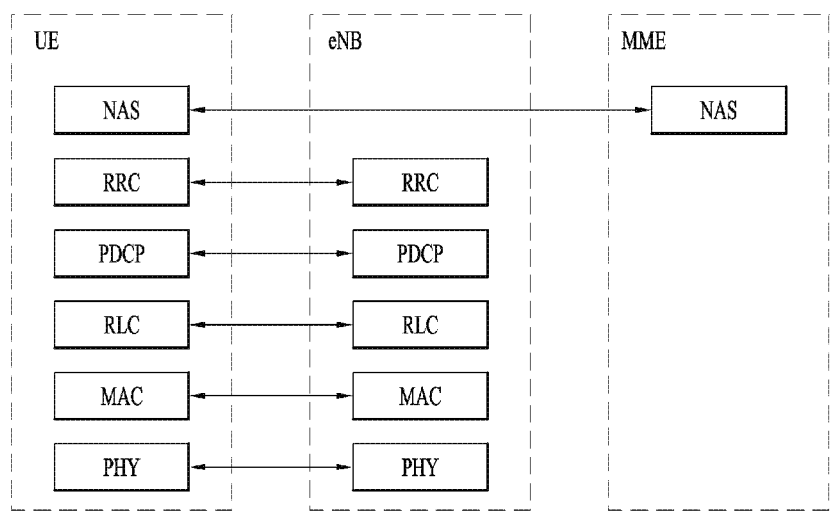
FIG. 3 is a diagram showing a control plane and a user plane of a radio interface protocol between a UE and an E-UTRAN based on a 3rd generation partnership project (3GPP) radio access network standard.
Figure 3:
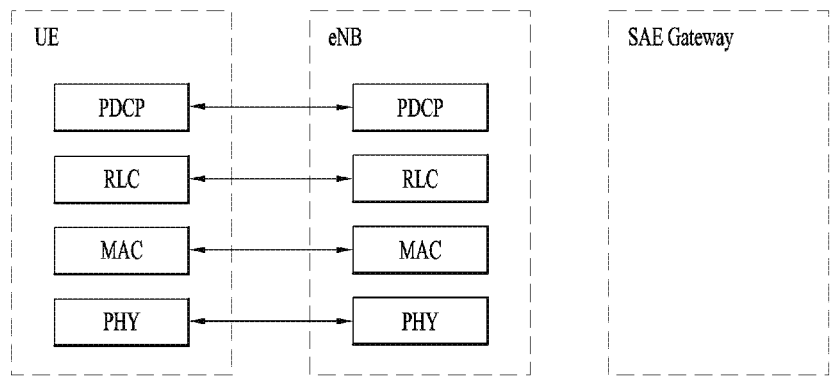

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
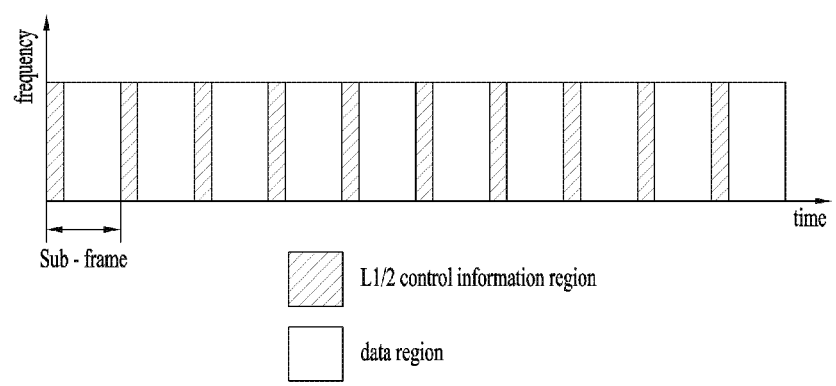
FIG. 4 is a view showing an example of a physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PD-CCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
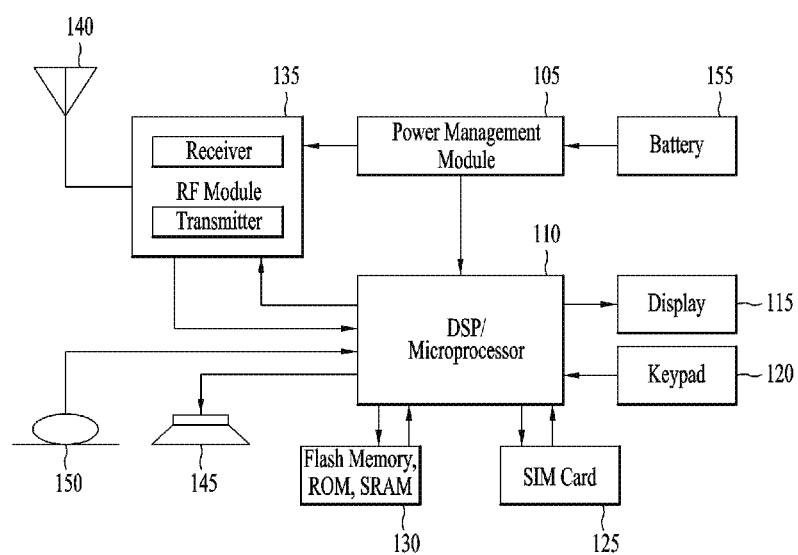
FIG. 5 is a block diagram of a communication apparatus according to an embodiment of the present invention.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transmiceiver; 135). The DSP/microprocessor (110) is electrically connected with the transciver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Figure 6:
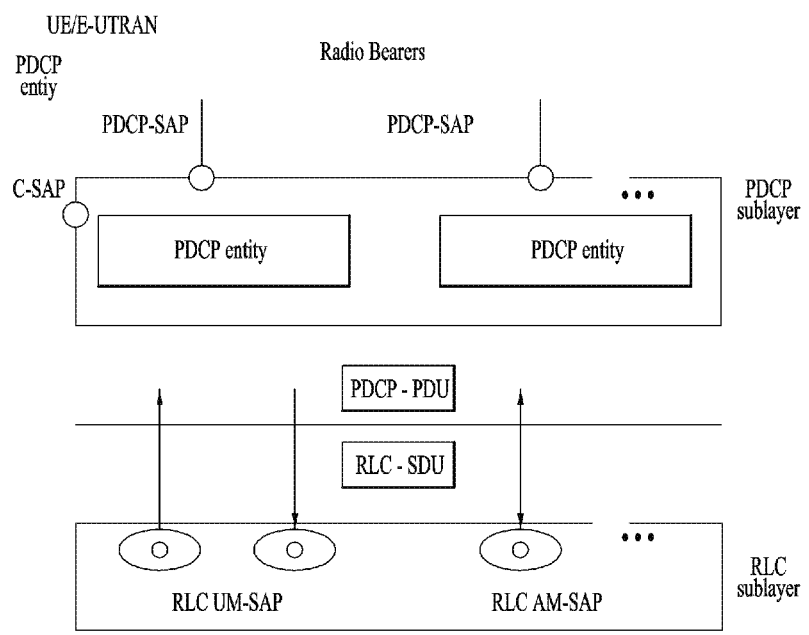
FIG. 6 is a conceptual diagram for a PDCP entity architecture.

FIG. 6 is a conceptual diagram for a PDCP entity architecture.

FIG. 6 represents one possible structure for the PDCP sublayer, but it should not restrict implementation. Each RB (i.e. DRB and SRB, except for SRB0) is associated with one PDCP entity. Each PDCP entity is associated with one or two (one for each direction) RLC entities depending on the RB characteristic (i.e. uni-directional or bi-directional) and RLC mode. The PDCP entities are located in the PDCP sublayer. The PDCP sublayer is configured by upper layers.

Figure 7:
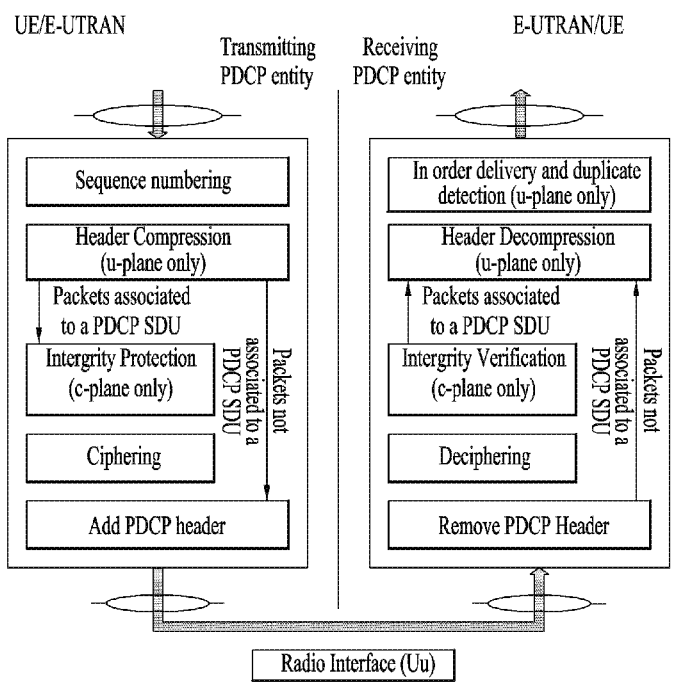
FIG. 7 is a conceptual diagram for functional view of a PDCP entity.

FIG. 7 is a conceptual diagram for functional view of a PDCP entity.

The PDCP entities are located in the PDCP sublayer. Several PDCP entities may be defined for a UE. Each PDCP entity carrying user plane data may be configured to use header compression. Each PDCP entity is carrying the data of one radio bearer. In this version of the specification, only the robust header compression protocol (ROHC), is supported. Every PDCP entity uses at most one ROHC compressor instance and at most one ROHC decompressor instance. A PDCP entity is associated either to the control plane or the user plane depending on which radio bearer it is carrying data for.

FIG. 7 represents the functional view of the PDCP entity for the PDCP sublayer, it should not restrict implementation. For RNs, integrity protection and verification are also performed for the u-plane.

At reception of a PDCP SDU from upper layers, the UE may start a discard timer associated with the PDCP SDU. For a PDCP SDU received from upper layers, the UE may associate a PDCP SN (Sequence Number) corresponding to Next_PDCP_TX_SN to the PDCP SDU, perform header compression of the PDCP SDU, perform integrity protection and ciphering using COUNT based on TX_HFN and the PDCP SN associated with this PDCP SDU, increment the Next_PDCP_TX_SN by one, and submit the resulting PDCP Data PDU to lower layer.

If the Next_PDCP_TX_SN is greater than Maximum_PDCP_SN, the Next_PDCP_TX_SN is set to '0' and TX_HFN is incremented by one.

When the discard timer expires for a PDCP SDU, or the successful delivery of a PDCP SDU is confirmed by PDCP status report, the UE may discard the PDCP SDU along with the corresponding PDCP PDU. If the corresponding PDCP PDU has already been submitted to lower layers the discard is indicated to lower layers. The transmitting side of each PDCP entity for DRBs may maintain the discard timer. The duration of the timer is configured by upper layers. In the transmitter, a new timer is started upon reception of an SDU from upper layer.

Figure 8A:
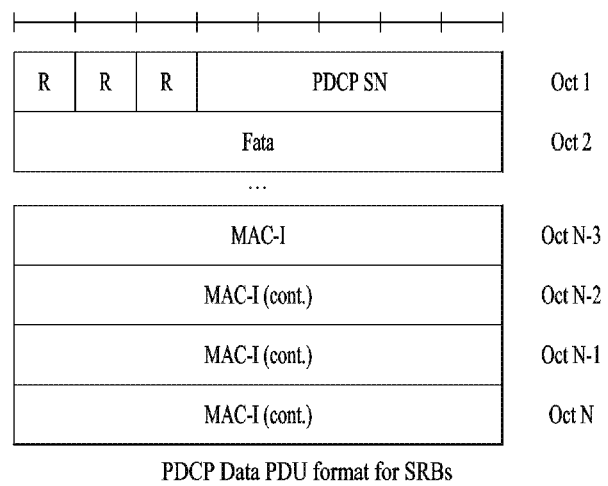
FIGS. 8A to 8C are diagrams for formats of PDCP data PDU.
Figure 8B:
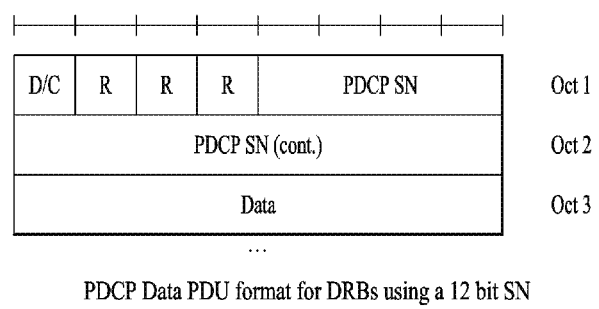
Figure 8C:
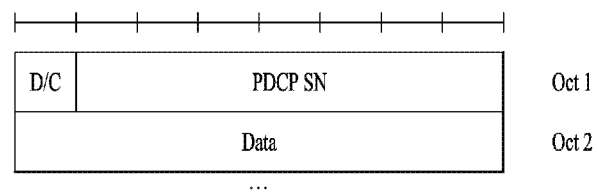

FIGS. 8A to 8C are diagrams for formats of PDCP data PDU.

A PDCP PDU is a bit string that is byte aligned (i.e. multiple of 8 bits) in length. In FIGS. 8A to 8C, bit strings are represented by tables in which the most significant bit is the leftmost bit of the first line of the table, the least significant bit is the rightmost bit on the last line of the table, and more generally the bit string is to be read from left to right and then in the reading order of the lines. The bit order of each parameter field within a PDCP PDU is represented with the first and most significant bit in the leftmost bit and the last and least significant bit in the rightmost bit.

PDCP SDUs are bit strings that are byte aligned (i.e. multiple of 8 bits) in length. A compressed or uncompressed SDU is included into a PDCP PDU from the first bit onward.

FIG. 8A shows the format of the PDCP Data PDU carrying data for control plane SRBs.

FIG. 8B shows the format of the PDCP Data PDU when a 12 bit SN length is used. This format is applicable for PDCP Data PDUs carrying data from DRBs mapped on RLC AM or RLC UM.

FIG. 8C shows the format of the PDCP Data PDU when a 7 bit SN length is used. This format is applicable for PDCP Data PDUs carrying data from DRBs mapped on RLC UM.

The PDCP Data PDU is used to convey: a PDCP SDU SN, and data including an uncompressed PDCP SDU (user plane data, or control plane data), a compressed PDCP SDU (user plane data only), and a MAC-I field.

The PDCP SN field indicates a sequence number of PDCP SDU. The length of the PDCP SN is 5, 7, 12, 14, 16 or 18 bits as indicated in Table 1.

TABLE 1

| Length | Description |
| --- | --- |
| 5 | SRBs |
| 7 | DRBs, if configured by upper layers (pdcp-SN-Size [3]) |
| 12 | DRBs, if configured by upper layers (pdcp-SN-Size [3]) |
| 15 | DRBs, if configured by upper layers (pdcp-SN-Size [3]) |
| 16 | SLRBs |
| 18 | DRBs, if configured by upper layers (pdcp-SN-Size [3]) |

The MAC-I field carries a message authentication code calculated. The length of the MAC-I is 32-bits. For control plane data that are not integrity protected, the MAC-I field is still present and should be padded with padding bits set to 0.

The R field is reserved. The length of the R field is 1 bit. In this version of the specification reserved bits shall be set to 0. Reserved bits shall be ignored by the receiver.

The D/C field indicates whether a PDCP PDU is a control PDU or a Data PDU. The D/C field is indicated by Table 2.

TABLE 2

| Bit | Description |
| --- | --- |
| 0 | Control PDU |
| 1 | Data PDU |

Figure 9A:
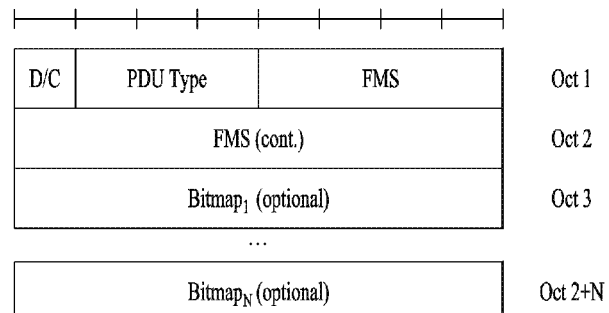
FIGS. 9A to 9D are diagrams for formats of PDCP control PDU.
Figure 9B:
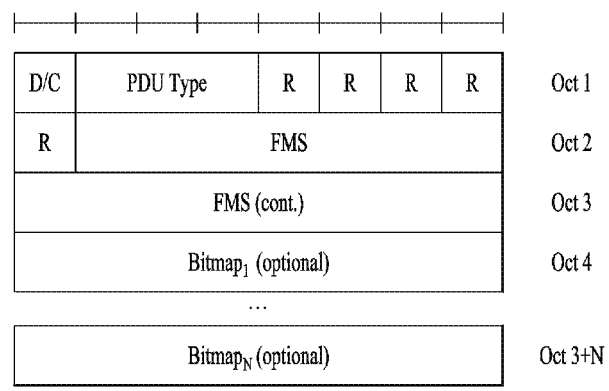
Figure 9C:
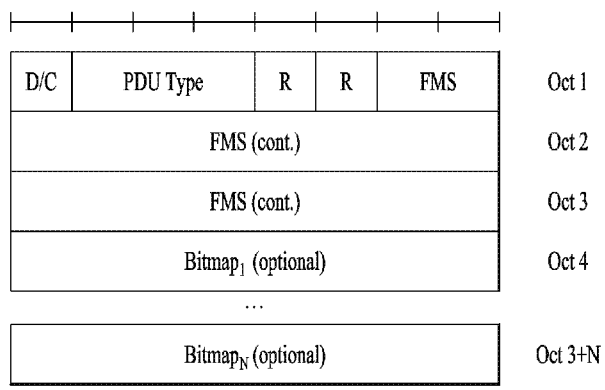

FIGS. 9A to 9C are diagrams for formats of PDCP control PDU.

The PDCP Control PDU is used to convey: i) a PDCP status report indicating which PDCP SDUs are missing and which are not following a PDCP re-establishment, ii) header compression control information, e.g. interspersed ROHC feedback.

FIG. 9A shows the format of the PDCP Control PDU carrying one PDCP status report when a 12 bit SN length is used, FIG. 9B shows the format of the PDCP Control PDU carrying one PDCP status report when a 15 bit SN length is used, and FIG. 9C shows the format of the PDCP Control PDU carrying one PDCP status report when an 18 bit SN length is used. This format is applicable for DRBs mapped on RLC AM.

Figure 9D:
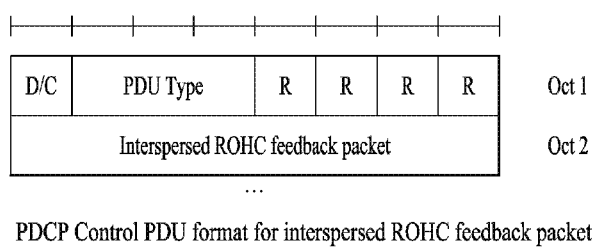

FIG. 9D shows the format of the PDCP Control PDU carrying one interspersed ROHC feedback packet. This format is applicable for DRBs mapped on RLC AM or RLC UM.

The D/C field indicates whether a PDCP PDU is a control PDU or a Data PDU. The D/C field is indicated by Table 2.

The PDU type field indicates for what the control PDU is. The PDU type field is indicated by Table 3.

TABLE 3

| Bit | Description |
|---|---|
| 000 | PDCP status report |
| 001 | Interspersed ROHC feedback packet |
| 010-111 | reserved |

The FMS is a PDCP SN of the first missing PDCP SDU. The length of the FMS field is 12-bits when a 12 bit SN length is used, 15-bits when a 15 bit SN length is used, and 18-bits when an 18 bit SN length is used.

The MSB of the first octet of the type "Bitmap" indicates whether or not the PDCP SDU with the SN (FMS+1) modulo (Maximum_PDCP_SN+1) has been received and, optionally decompressed correctly. The LSB of the first octet of the type "Bitmap" indicates whether or not the PDCP SDU with the SN (FMS+8) modulo (Maximum_PDCP_SN+1) has been received and, optionally decompressed correctly.

Figure 10A:
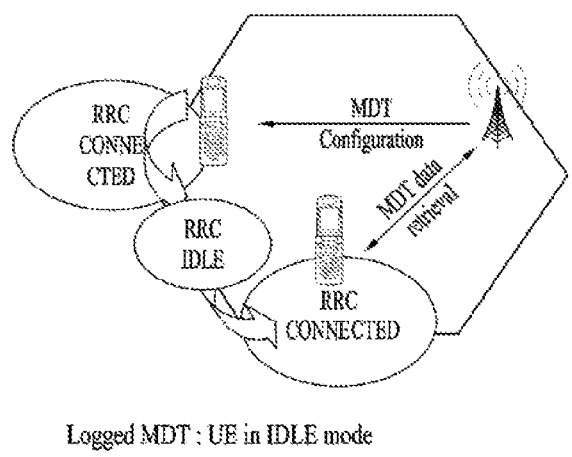
FIG. 10A is a conceptual diagram for Logged MDT.
Figure 10B:
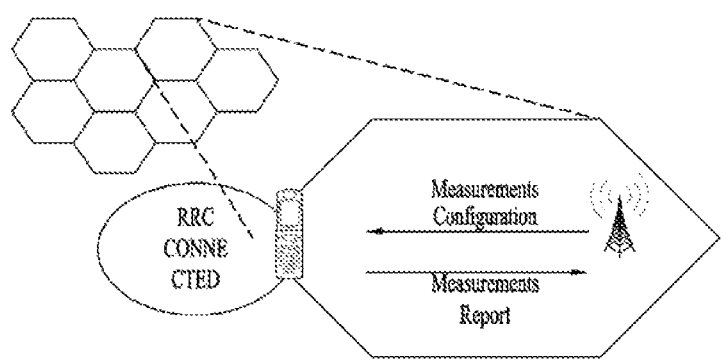
FIG. 10B is a conceptual diagram for Immediate MDT

FIG. 10A is a conceptual diagram for Logged MDT, and FIG. 10B is a conceptual diagram for Immediate MDT.

In wireless mobile networks quality of user experience changes dynamically and depends on large variety of factors. Because of that mobile operators are willing to timely and effectively evaluate provided Quality of Service (QoS) in their networks. Nowadays the main tool for monitoring network state and performance is drive testing. To replace this expensive and mostly manual procedure, concept of Minimization of Drive Tests (MDT) is being developed in 3GPP LTE standardization.

MDT is about UE measurement collection for off-line processing. No automatic mechanism is defined MDT. The MDT mode includes 2 modes for MDT measurements: Logged MDT and Immediate MDT.

The Immediate MDT is that a MDT functionality involving measurements performed by the UE in CONNECTED state and reporting of the measurements to eNB/RNC available at the time of reporting condition as well as measurements by the network for MDT purposes. The Logged MDT is a MDT functionality involving measurement logging by UE in IDLE mode, CELL_PCH, URA_PCH states and CELL_FACH state when second DRX cycle is used (when UE is in UTRA) for reporting to eNB/RNC at a later point in time, and logging of MBSFN measurements by E-UTRA UE in IDLE and CONNECTED modes.

Measurements to be performed for Immediate MDT purposes involve reporting triggers and criteria utilized for RRM. An MDT specific UE-based measurement for UL PDCP delay is applied for QoS verification purpose. In addition, there are measurements performed in eNB.

The objective of this measurement is to measure L2 Packet Delay for OAM performance observability or for QoS verification of MDT.

Packet Delay is in the DL per QCI. This measurement refers to packet delay for DRBs. For arrival of packets the reference point is PDCP upper SAP. For successful reception the reference point is MAC lower SAP. The measurement is done separately per QCI. The Detailed Definition is Equation 1 and explanations can be found in the Table 4 below.

$$M(T, qci) = \left[ \frac{\sum_{\forall i} tAck(i) - tArriv(t)}{I(T)} \right]$$ [Equation 1]

TABLE 4

| | |
|---|---|
| M(T, qci) | Packet Delay in the DL per QCI, averaged during time period T. Unit: Integer ms. |
| tArriv(i) | The point in time when PDCP SDU i arrives. |
| tAck(i) | The point in time when the last piece of PDCP SDU i was received by the UE according to received HARQ feedback information. |
| i | A PDCP SDU that arrives at the PDCP upper SAP during time period T. PDCP SDU for which HARQ acknowledgement is not received for all parts shall not be included in the calculation. |
| I(T) | Total number of PDCP SDUs i. |
| T | Time Period during which the measurement is performed |

In the prior art, the packet delay in downlink is measured by the eNB based on the HARQ feedback. However, the delay measurement method in downlink cannot be used for uplink, because the eNB cannot know the time when the UE PDCP receives a PDCP SDU from an upper layer.

Packet Delay Measurements

In section 4.1.4.1 of TS36.314, the packet delay in DL is measured by the eNB. The delay is calculated as the time difference between "the point in time when the last piece of PDCP SDU was received by the UE according to received HARQ feedback information" and "the point in time when PDCP SDU arrives at the PDCP entity".

As the packet reception time is measured as HARQ feedback reception time by the eNB, the delay time measured by the eNB is not accurate in that: i) the point in time when the UE receives a HARQ data and when the eNB receives the HARQ feedback are different; ii) HARQ reordering time, RLC processing time, and PDCP processing time are not considered.

Therefore, we think the existing "DL packet delay measurement" is not suitable for measuring delay and loss rate of PDCP layer. For UL, there is no measurement defined in TS36.314. As the eNB does not know when a PDCP SDU arrives at the UE PDCP entity, it was not possible to define any eNB measurement mechanism in Rel-11.

Packet Loss Rate Measurements

The data loss measurement is specified in section 4.1.5.2 and 4.1.5.3 of TS36.314, where "DL packet Uu loss rate" and "UL packet Uu loss rate" are defined. In these measurements, the number of lost packets is counted based on the PDCP SN.

For Rel-13 MDT QoS verification, we think the existing mechanisms can still be applied for measuring packet loss rate. Though the size of packets may vary packet by packet, counting the number of lost packets is an important measure considering that any single byte error causes corruption of whole packet.

The difficulty is that the PDCP transmitter does not know when the PDCP SDU is delivered to upper layer in the PDCP receiver, and the PDCP receiver does not know when the PDCP SDU is received by the PDCP transmitter. It means that a signaling is needed between PDCP transmitter and PDCP receiver in order to measure the delay in PDCP upper SAP.

Thus, we think a new mechanism should be introduced to measure packet delay in a PDCP layer. To cover total delay experienced in AS layer, the reference point should be PDCP upper SAP, i.e. from the time the PDCP transmitter receives a PDCP SDU from upper layers to the time the PDCP receiver delivers the PDCP SDU to upper layers.

An intuitive solution would be that the PDCP transmitter marks a Time Stamp on a PDCP SDU and transmits it to the PDCP receiver. Then, the PDCP receiver calculates the total delay as the time difference between the time when it delivers the PDCP SDU to the upper layer and the time indicated by the Time Stamp.

Figure 11:
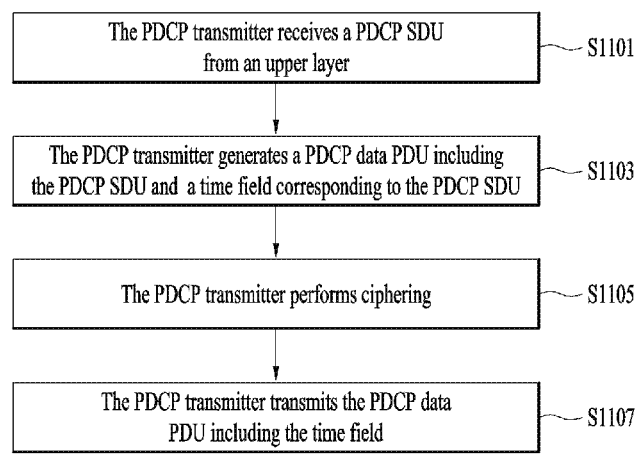
FIG. 11 is a conceptual diagram for generating PDCP PDU for performing a packet delay calculation in a PDCP entity in a wireless communication system according to embodiments of the present invention.

FIG. 11 is a conceptual diagram for generating PDCP PDU for performing a packet delay calculation in a PDCP entity in a wireless communication system according to embodiments of the present invention.

When the PDCP transmitter receives a PDCP SDU from an upper layer (S1101), the PDCP transmitter generates a PDCP data PDU including the PDCP SDU and a time field corresponding to the PDCP SDU (S1103).

In this time, the PDCP transmitter can insert a time field to the PDCP PDU.

The time field is represented as one of the followings: i) subframe number (0~40959, 16 bits are required), ii) radio frame number (0~4095, 12 bits are required), or iii) absolute time.

The PDCP transmitter sets a value of the time field for a PDCP SDU to a time when the PDCP SDU is received from an upper layer, or the corresponding PDCP PDU is submitted to a lower layer.

Figure 12A:
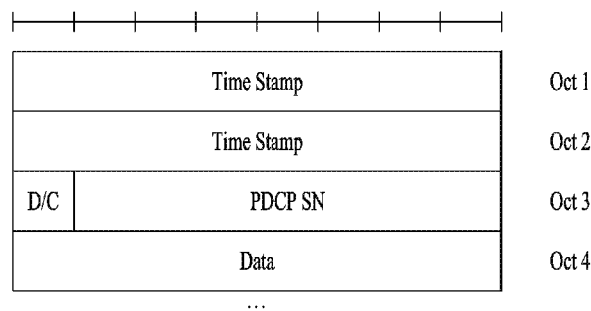
FIG. 12 is a diagram for PDCP data PDU format according to embodiments of the present invention.
Figure 12B:
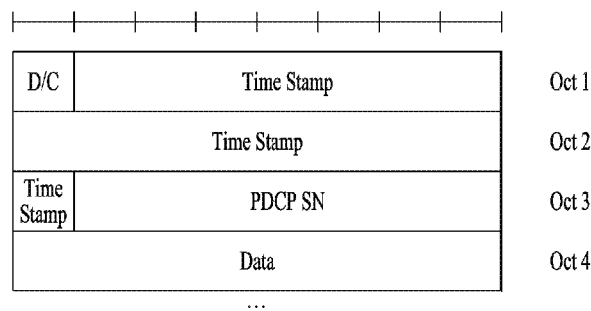
Figure 12C:
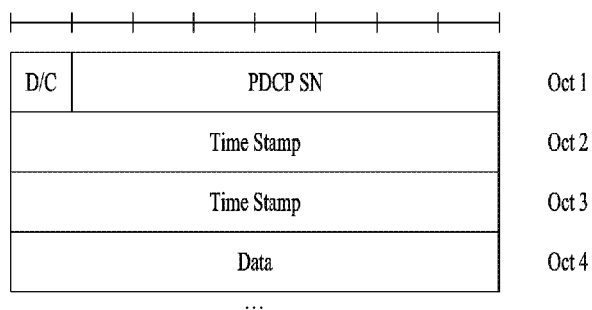
Figure 12D:
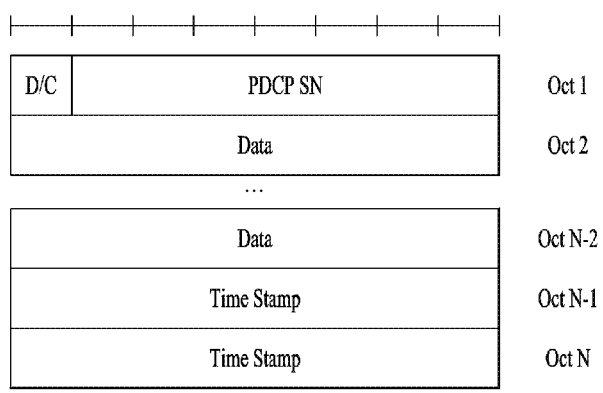

The time field is included in the PDCP PDU with the position as one of the followings: i) at the beginning of the PDCP PDU (FIG. 12A), ii) after D/C field before PDCP SN field (FIG. 12B), iii) after PDCP SN field before Data field (FIG. 12C), or iv) at the end of the PDCP PDU (FIG. 12D).

FIG. 12A to FIG. 12D are examples with 7 bits PDCP SN (assuming 16 bits time field).

FIG. 12A is a diagram for PDCP data PDU including the time field followed by an octet containing a D/C field directly. FIG. 12B is a diagram for PDCP data PDU including a first octet containing a D/C field and the time field followed by the PDCP SN field directly. FIG. 12C is a diagram for PDCP data PDU including a first octet containing a PDCP SN field followed by the time field directly, and the time field followed by data field directly. FIG. 12D is a diagram for the PDCP data PDU includes a data field followed by the time field directly.

Preferably, the PDCP transmitter attaches the time field in each transmitted PDCP PDU. The PDCP transmitter attaches the time field in every Nth PDCP PDU. For example, the time field is included in PDCP PDUs with PDCP SN=0, 4, 8, 12, 16, . . . The periodicity of inclusion of time field is configured by the eNB via RRC messages or PDCP Control PDU.

In the periodic case, the PDCP transmitter checks whether a PDCP SN associated with a PDCP SDU is multiple of N or not when the PDCP SDU is received from an upper layer.

And the PDCP transmitter generates a PDCP data PDU including the PDCP SDU and a time field corresponding to the PDCP SDU if the condition is met.

The PDCP transmitter performs ciphering for only Data field, i.e. D/C, PDCP SN, and Time fields are not ciphered, or Data field and Time field, i.e. D/C and PDCP SN fields are not ciphered (S1105).

The PDCP transmitter transmits the PDCP data PDU including the time field to a PDCP receiver (S1107).

Indeed, the PDCP receiver can transmits requests a use of the time field to the PDCP transmitter. In this case, the PDCP transmitter can insert the time field to the PDCP data PDU after the requests is received.

Figure 13:
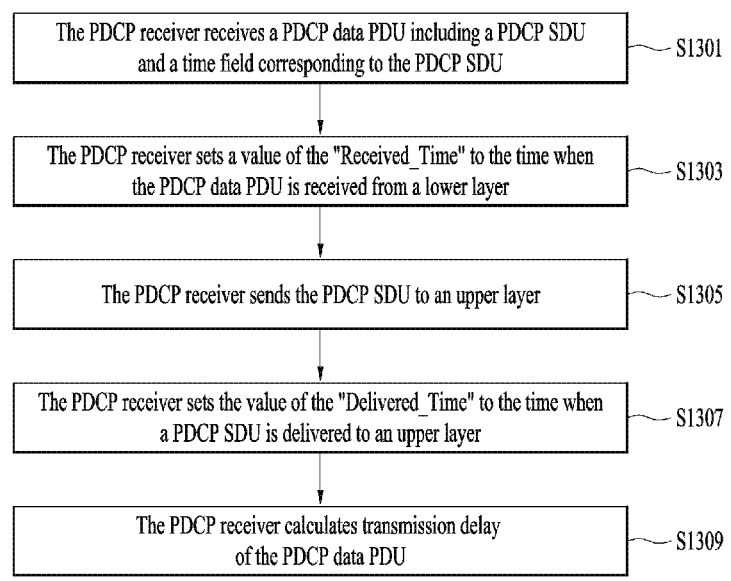
FIG. 13 is a conceptual diagram for performing a packet delay calculation in a PDCP entity in a wireless communication system according to embodiments of the present invention.

FIG. 13 is a conceptual diagram for performing a packet delay calculation in a PDCP entity in a wireless communication system according to embodiments of the present invention.

When the PDCP receiver receives a PDCP data PDU including a PDCP SDU and a time field corresponding to the PDCP SDU from a PDCP transmitter (S1301), the PDCP receiver maintains a state variable "Received_Time" for each received PDCP PDU. The PDCP receiver sets a value of the "Received_Time" to the time when the PDCP data PDU is received from a lower layer, or the MAC PDU containing the PDCP data PDU is received by a HARQ process (S1303).

Or, when the PDCP receiver sends the PDCP SDU to an upper layer (S1305), the PDCP receiver maintains a state variable "Delivered_Time" for each delivered PDCP SDU. The PDCP receiver sets the value of the "Delivered_Time" to the time when a PDCP SDU is delivered to an upper layer (S1307).

The PDCP receiver calculates the transmission delay of the PDCP data PDU by subtracting Received_Time by a value of the time field included in the PDCP PDU or the PDCP receiver calculates the transmission delay of the PDCP SDU by subtracting Delivered_Time by a value of the time field included in the PDCP PDU (S1309).

Preferably, use of a new PDCP Data PDU including the time field is configured by the eNB via RRC messages or PDCP Control PDU.

Preferably, the use of time field is configured per radio bearer, and can be configured for a certain time period. The use of time field can be enabled or disabled.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a User Equipment (UE) operating in a wireless communication system, the method comprising:
   receiving, by a Packet Data Convergence Protocol (PDCP) transmitter, a PDCP Service Data Unit (SDU) from an upper layer;
   generating, by the PDCP transmitter, a PDCP data Protocol Data Unit (PDU) including the PDCP SDU and a time field corresponding to the PDCP SDU, wherein a value of the time field is set to a time when the PDCP SDU is received from the upper layer;
   performing, by the PDCP transmitter, ciphering only a data field and the time field of the PDCP data PDU, wherein a Data/Control (D/C) field and a PDCP Sequence Number(SN) field are not ciphered; and
   transmitting, by the PDCP transmitter, the generated PDCP data PDU to a PDCP receiver.

2. The method according to claim 1, wherein the time field is represented by using subframe number.

3. The method according to claim 1, wherein a length of the time field is 16-bits.

4. The method according to claim 1, wherein the PDCP data PDU includes the time field followed by an octet containing the D/C field directly.

5. The method according to claim 1, wherein the PDCP data PDU includes a first octet containing the PDCP SN field followed by the time field directly, and the time field followed by data field directly.

6. The method according to claim 1, wherein the PDCP data PDU includes a data field followed by the time field directly.

7. The method according to claim 1, further comprising:
   receiving, from a PDCP receiver, a request to include the time field in the PDCP PDU.

8. The method according to claim 1, wherein the time field is configured per radio bearer.

9. The method according to claim 1, wherein the time field is configured fora certain time period.

10. A method for a User Equipment (UE) operating in a wireless communication system, the method comprising:
    receiving, by a Packet Data Convergence Protocol (PDCP) transmitter, a condition for adding a time field to a PDCP data Protocol Data Unit (PDU);
    receiving, by the PDCP transmitter, a PDCP Service Data Unit (SDU) from an upper layer;
    checking, by the PDCP transmitter, whether the condition is met or not;
    generating, by the PDCP transmitter, a PDCP data PDU including the PDCP SDU and a time field corresponding to the PDCP SDU if the condition is met, wherein a value of the time field is set to a time when the PDCP SDU is received from the upper layer;
    performing, by the PDCP transmitter, ciphering only a data field and the time field of the PDCP data PDU, wherein a Data/Control (D/C) field and a PDCP Sequence Number(SN) field are not ciphered; and
    transmitting, by the PDCP transmitter, the generated PDCP data PDU to a PDCP receiver.

11. The method according to claim 10, wherein the condition is that a the PDCP SN associated with the PDCP SDU is multiple of N.

12. A method for a User Equipment (UE) operating in a wireless communication system, the method comprising:
    receiving, by a Packet Data Convergence Protocol (PDCP) receiver, a PDCP data Protocol Data Unit (PDU) including a PDCP Service Data Unit (SDU) and a time field corresponding to the PDCP SDU from a PDCP transmitter, wherein a value of the time field is set to a time when the PDCP transmitter received the PDCP SDU from an upper layer;
    performing, by the PDCP receiver, deciphering only a data field and the time field of the PDCP data PDU, wherein a Data/Control (D/C) field and a PDCP Sequence Number(SN) field were not ciphered;
    sending, by the PDCP receiver, the PDCP SDU to an upper layer; and
    calculating, by the PDCP receiver, a packet transmission delay in a radio interface based on a time of sending the PDCP SDU and the value of the of time field included in the PDCP data PDU.

13. The method according to claim 12, wherein when the PDCP receiver calculates the packet transmission delay, the PDCP receiver subtracts the value of the time field included in the PDCP data PDU from the time of sending the PDCP SDU.

* * * * *